United States Patent
Tsirkin

(10) Patent No.: US 10,459,771 B2
(45) Date of Patent: Oct. 29, 2019

(54) LIGHTWEIGHT THREAD SYNCHRONIZATION USING SHARED MEMORY STATE

(71) Applicant: Red Hat Israel, Ltd., Ra'anana (IL)

(72) Inventor: Michael Tsirkin, Lexington, MA (US)

(73) Assignee: RED HAT ISRAEL, LTD., Ra'anana (IL)

( * ) Notice: Subject to any disclaimer, the term of this patent is extended or adjusted under 35 U.S.C. 154(b) by 150 days.

(21) Appl. No.: 15/438,992

(22) Filed: Feb. 22, 2017

(65) Prior Publication Data

US 2018/0239652 A1 Aug. 23, 2018

(51) Int. Cl.
G06F 9/46 (2006.01)
G06F 9/52 (2006.01)

(52) U.S. Cl.
CPC ................... G06F 9/52 (2013.01)

(58) Field of Classification Search
CPC ........... G06F 9/52; G06F 9/485; G06F 9/4881
See application file for complete search history.

(56) References Cited

U.S. PATENT DOCUMENTS

| | | | |
|---|---|---|---|
| 5,852,731 A * | 12/1998 | Wang | G06F 9/52 718/100 |
| 6,782,440 B2 | 8/2004 | Miller | |
| 6,912,621 B2 | 6/2005 | Harris | |
| 7,788,669 B2 | 8/2010 | England et al. | |
| 8,434,099 B2 | 4/2013 | Forin et al. | |
| 8,831,025 B2 * | 9/2014 | Finney | H04L 49/00 370/412 |
| 8,832,698 B1 * | 9/2014 | Chai | G06F 9/4843 718/102 |
| 8,984,256 B2 | 3/2015 | Fish | |
| 2002/0046230 A1 | 4/2002 | Dieterich et al. | |
| 2007/0067770 A1 * | 3/2007 | Thomasson | G06F 9/52 718/100 |
| 2014/0173619 A1 * | 6/2014 | Nakashima | G06F 9/4893 718/104 |

(Continued)

OTHER PUBLICATIONS

Li et al., The Thrifty Barrier: Energy-Aware Synchronization in Shared-Memory Multiprocessors, Computer Systems Laboratory Cornell University, Electrical and Computer Engineering University of Rochester, Feb. 14, 2004 (10 pages).

(Continued)

Primary Examiner — Camquy Truong
(74) Attorney, Agent, or Firm — K&L Gates LLP

(57) ABSTRACT

A system and method for lightweight thread synchronization using a shared memory state includes exposing, by an operating system executing on one or more processors, a memory mapping interface. The one or more processors may execute a first thread and a second thread. A supervisor in the operating system may map a memory page storing an execution state of the first thread to a memory location accessible by the second thread. The first thread may be configured to store at least one request in a shared memory. The second thread may be configured to poll the shared memory to execute the at least one request stored in the shared memory. Then, the supervisor may update the execution state of the first thread stored in the memory page. The execution state may be either a working state or a not-working state.

18 Claims, 6 Drawing Sheets

(56) References Cited

U.S. PATENT DOCUMENTS

2015/0089495 A1 3/2015 Persson et al.
2016/0011996 A1 1/2016 Asaad et al.

OTHER PUBLICATIONS

Zhu et al., Synchronization State Buffer: Supporting Efficient Fine-Grain Synchronization on Many-Core Architectures, Jun. 9, 2007 (11 pages).

* cited by examiner

LIGHTWEIGHT THREAD SYNCHRONIZATION USING SHARED MEMORY STATE

BACKGROUND

Thread synchronization is a technique for a concurrent execution of multiple threads. A thread or a thread of execution is a software unit. In a multi-processor/multi-core system, multiple threads can be executed in parallel. That is, each of the processors or cores may execute a thread simultaneously. Thread synchronization ensures that these multiple threads cooperate to spread the workload to be executed efficiently between the multiple threads. One thread can pass a request to another thread to cause it to be executed.

In computer systems, shared memory may refer to memory that can be accessed simultaneously by different resources, such as computer hardware or software. In computer hardware, shared memory is typically random access memory (RAM) that is accessible from different central processing units (CPUs) in a multi-processor system. In computer software, shared memory generally refers to an area of RAM that is accessible to multiple processes or threads. In software systems, such availability allows a single copy of data to service multiple resources, instead of providing a separate copy of the data for each specific resource.

SUMMARY

The present disclosure provides new and innovative methods and systems for lightweight thread synchronization using a shared memory state. For example, an example method includes exposing, by an operating system executing on one or more processors, a memory mapping interface. The one or more processors execute a first thread and a second thread. A supervisor in the operating system maps a memory page storing an execution state of the first thread to a memory location accessible by the second thread via memory access commands of a processor. The first thread is configured to store at least one request in a shared memory. The second thread is configured to poll the shared memory to execute the at least one request stored in the shared memory. Then, the supervisor updates the execution state of the first thread stored in the memory page. The execution state is one of a working state and a not-working state.

Additional features and advantages of the disclosed methods and system are described in, and will be apparent from, the following Detailed Description and the Figures.

DETAILED DESCRIPTION OF EXAMPLE EMBODIMENTS

Figure 1:
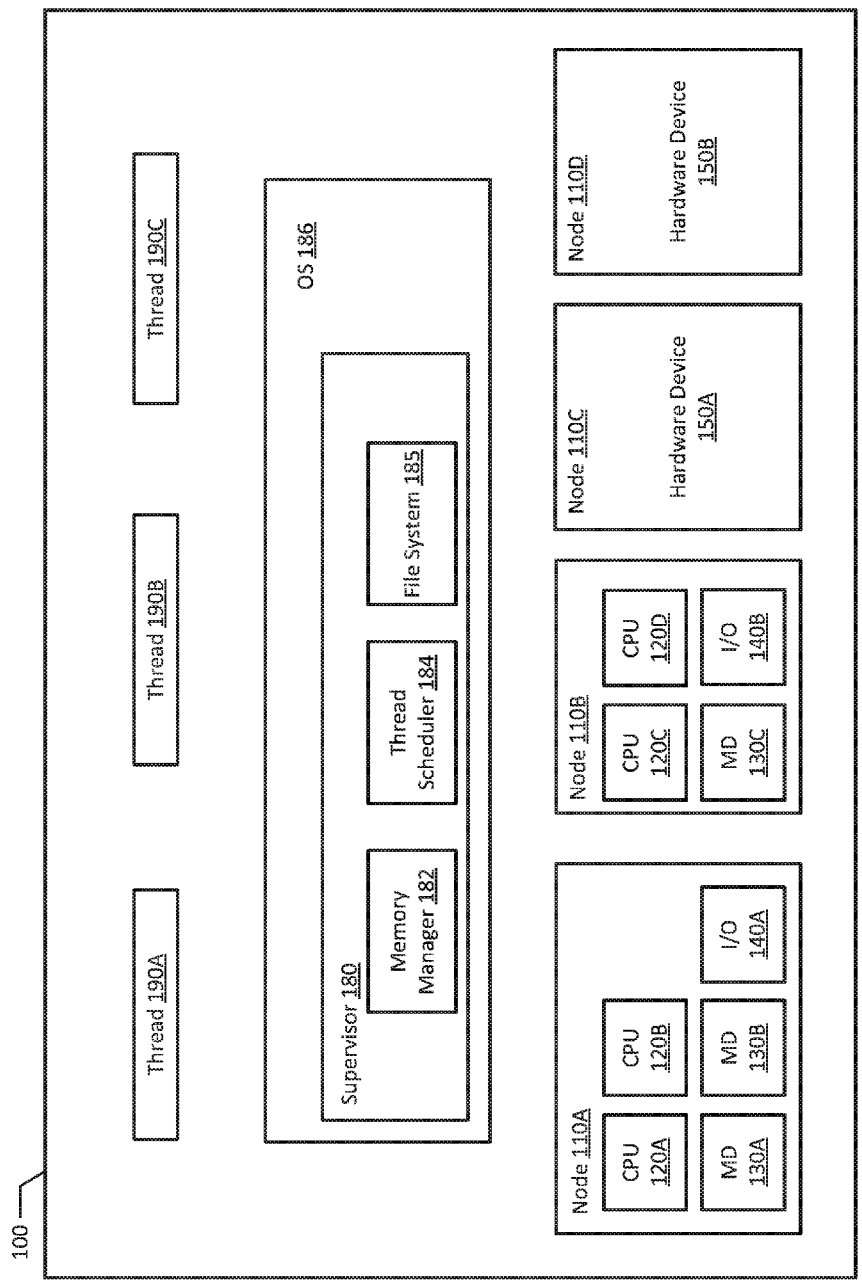
FIG. 1 is a block diagram of an example system for lightweight thread synchronization using a shared memory state according to an example embodiment of the present disclosure.

Described herein are methods and systems for lightweight thread synchronization using a shared memory state. Busy-polling of a shared memory is a technique typically used for low-latency applications, such as Network Function Virtualization (NFV), which generally cannot afford the cost of system call overhead. In this technique, a master thread may pass a request for execution to another slave thread by storing the request in a shared memory. The slave thread may detect the request by repeatedly reading (i.e., polling) the shared memory. When the master thread is not working, no requests will be stored in the shared memory. Therefore, polling the shared memory when the master thread is not working may be a waste of CPU cycles and power. In order to avoid the waste of CPU resources, when the master thread stops processing requests for a long time, the master thread may signal this to the slave thread through the shared memory, which causes the slave thread to enter a sleep state.

Generally, when there are routinely sufficient processors in an idle state, this approach may typically work well. However, this approach is not effective when there are not enough processors that are in an idle state (e.g., a system having a dynamic and demanding workload, such as NFV). For example, if all processors are in non-idle states, the operating system may preempt the master thread without giving the master thread a chance to notify the slave thread that the master thread will be in a not-working state. As used herein, preemption may refer to an interruption by the operating system of the subject thread without the subject thread's cooperation in order to execute another task on the physical processor, on which the subject thread was running, with the intention of resuming execution of the subject thread at a later time. Then, the slave thread may keep polling the shared memory without knowing that the master thread, which is configured to pass requests to the slave thread, is not working, causing waste of CPU cycles and power.

Waking up the slave thread in a sleep state generally requires a system call. Therefore, stopping the slave thread randomly or periodically to solve this problem may not be efficient because this may require more system calls to wake up the slave thread and increase the system call overhead, which is not affordable for a system with demanding workloads, such as an NFV system.

Aspects of the present disclosure may address the above noted deficiency by using a shared memory state for lightweight thread synchronization. In an example, an operating system exposes a memory mapping interface. Then, an application including a slave thread issues a memory map system call (e.g., mmap), through the memory mapping interface. Upon detecting the memory map system call, a supervisor in the operating system maps a memory page storing an execution state of a master thread to a memory location accessible by a slave thread. The memory mapping interface (e.g. the memory map system call) may use a file in a file system (e.g., /proc/<process-id>/running on Linux) of the supervisor. The memory mapping interface enables the slave thread to detect whether the master thread is working or not working without a system call. For example, the master thread stores requests in a shared memory and the slave thread polls the shared memory to execute the requests stored in the shared memory. Then, the supervisor updates the execution state of the master thread whenever the master thread starts working or stops working.

When the master thread starts working and storing requests in the shared memory, the supervisor may update the execution state of the master thread to be "Working." Then, the slave thread may poll the shared memory, find requests stored by the master thread, and execute any requests stored in the shared memory. When the master thread stops working, the supervisor may detect this and update the execution state of the master thread to be "Not-Working." The slave thread may detect that the master thread is not working (e.g., preempted) by reading the memory location mapped to the memory page storing the execution state of the master thread. Then, the slave thread may stop polling the shared memory. Then, the slave thread may record in the shared memory that the slave thread is in a sleep state and may enter the sleep state.

When the master thread is woken up and restarts working and storing requests in the shared memory, the supervisor may update the execution state of the master thread to be "Working." After learning that the slave thread is in the sleep state through the shared memory, the master thread may notify the supervisor to instruct the slave thread to restart polling the shared memory. Responsive to receiving the notification, the supervisor may wake up the slave thread and make the slave thread start polling the shared memory. In this way, the present disclosure may be capable of providing a system where the slave thread can stop polling when the master thread stops working. This may advantageously reduce a waste of CPU cycles and power.

Since the state of the slave thread can be inferred without invoking system calls, the present disclosure may reduce system call overhead, enabling lightweight thread synchronization. Therefore, the present disclosure advantageously improves scalability of a computer system where more applications can run on a given host CPU, and obtains better CPU utilization, which allows addressing requirements for a system with demanding workloads, such as a latency-sensitive NFV system. Additional features and advantages of the disclosed method, system, and apparatus are described below.

FIG. 1 depicts a high-level component diagram of an example system 100 in accordance with one or more aspects of the present disclosure. The system 100 may include a memory (e.g., MD 130A-C), an operating system (OS) 186, and one or more processors (CPU 120A-D) configured to execute threads. The OS 186 may include a supervisor 180 and an interrupt handler. The supervisor 180 may be a privileged software component of the OS 186. In an example, the supervisor 180 may be implemented as a component of a kernel in the OS 186.

The supervisor 180 may include a memory manager 182, thread scheduler 184, and a file system 185. The memory manager 182 may manage mapping of memory pages and allocate the system's address spaces (e.g., locations in memory) to the users of the supervisor's services. The thread scheduler 184 may manage scheduling of threads (e.g., threads 190A-C) and determine the order various threads are handled. Additionally, the thread scheduler 184 may determine how various threads share the supervisor's processing time. In an example, the supervisor 180 may grant use of the computer system to each thread after it is scheduled by the thread scheduler 184. Additionally, the interrupt handler may handle requests from various hardware devices (e.g., Hardware Devices 150A-B) that require the supervisor's service.

Additionally a user may run programs or applications in the application space. An application may be an application in user space, an application in a virtual machine, or an application located elsewhere (e.g., a container), all of which make up the application space. An application may include/use threads (e.g., threads 190A-C).

The system 100 may include one or more interconnected nodes 110A-D. Each node 110A-B may in turn include one or more physical processors (e.g., CPU 120A-D) communicatively coupled to memory devices (e.g., MD 130A-C) and input/output devices (e.g., I/O 140A-B). In an example, the memory devices (e.g., MD 130A-C) may act as a shared memory such that they can be accessed simultaneously by different resources (e.g., processes or threads). Each node 110C-D may include a hardware device 150A-B. In an example embodiment, a hardware device (e.g., 150A-B) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The system 100 may also include one or more applications operating within application space. The system 100 may also include one or more threads 190A-C running on physical processors (e.g., CPU 120A-D). In an example, the threads 190A-C may be running in the application space.

In an example, the system 100 may include one or more master threads and one or more slave threads. The one or more master threads (e.g., 190A) may be configured to store requests in a shared memory. The one or more slave threads (e.g., 190B) may be configured to poll the shared memory and execute the requests stored in the shared memory. In an example, the system 100 may include one master thread (e.g., 190A) and multiple slave threads (e.g., 190B-C). In another example, the system 100 may include multiple master threads and multiple slave threads. In an example, the request may be a request for a networking application. In this case, the master slave may receive the networking request from a network and send to one of the multiple slave threads. Then, the slave thread may process the networking request, for example, by forwarding the networking request to other networking interface.

As used herein, physical processor or processor 120 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device (e.g., 130A-C) refers to a volatile or non-volatile memory device, such as RAM, ROM, EEPROM, or any other device capable of storing data. As discussed herein, I/O device (e.g., 140A-B) refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-C may be provided by one or more local buses of suitable architecture, for example, peripheral component interconnect (PCI).

Figure 2:
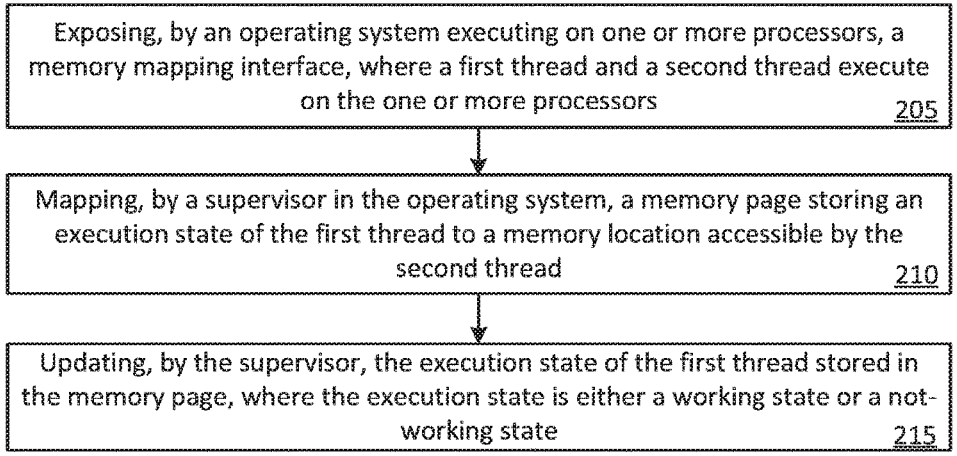
FIG. 2 is a flowchart illustrating an example method for lightweight thread synchronization using a shared memory state according to an example embodiment of the present disclosure.

FIG. 2 shows a flowchart of an example method 200 for lightweight thread synchronization using a shared memory state. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional.

In the illustrated example, an operating system executing on one or more processors may expose a memory mapping interface, where a first thread and a second thread execute on the one or more processors (block 205). For example, an operating system 186 executing on one or more processors 120A-D may expose a memory mapping interface, where a first (master) thread 190A and a second (slave) thread 190B execute on the one or more processors 120A-D. Then, a supervisor in the operating system may map a memory page storing an execution state of the first thread to a memory location accessible by the second thread (block 210). For example, a supervisor 180 in the operating system 186 may map a memory page storing an execution state of the first (master) thread 190A to a memory location accessible by the second (slave) thread 190B. This memory mapping interface may enable the second thread 190B to detect whether the first thread 190A is working or not working without a system call. In an example, a file system (e.g., file system 185) may include a file allowing access to the memory page storing the execution state of the first thread. In an example, the first thread (e.g., 190A) may be configured to store one or more requests in a shared memory and the second thread (e.g., 190B) may be configured to poll the shared memory to execute the one or more requests stored in the shared memory. Then, the supervisor may update the execution state of the first thread stored in the memory page, where the execution state is either a working state or a not-working state (block 215). For example, the supervisor 180 may update the execution state of the first (master) thread 190A stored in the memory page to either "working" or "not-working," or to binary states (e.g., 0 or 1).

Figure 3A:
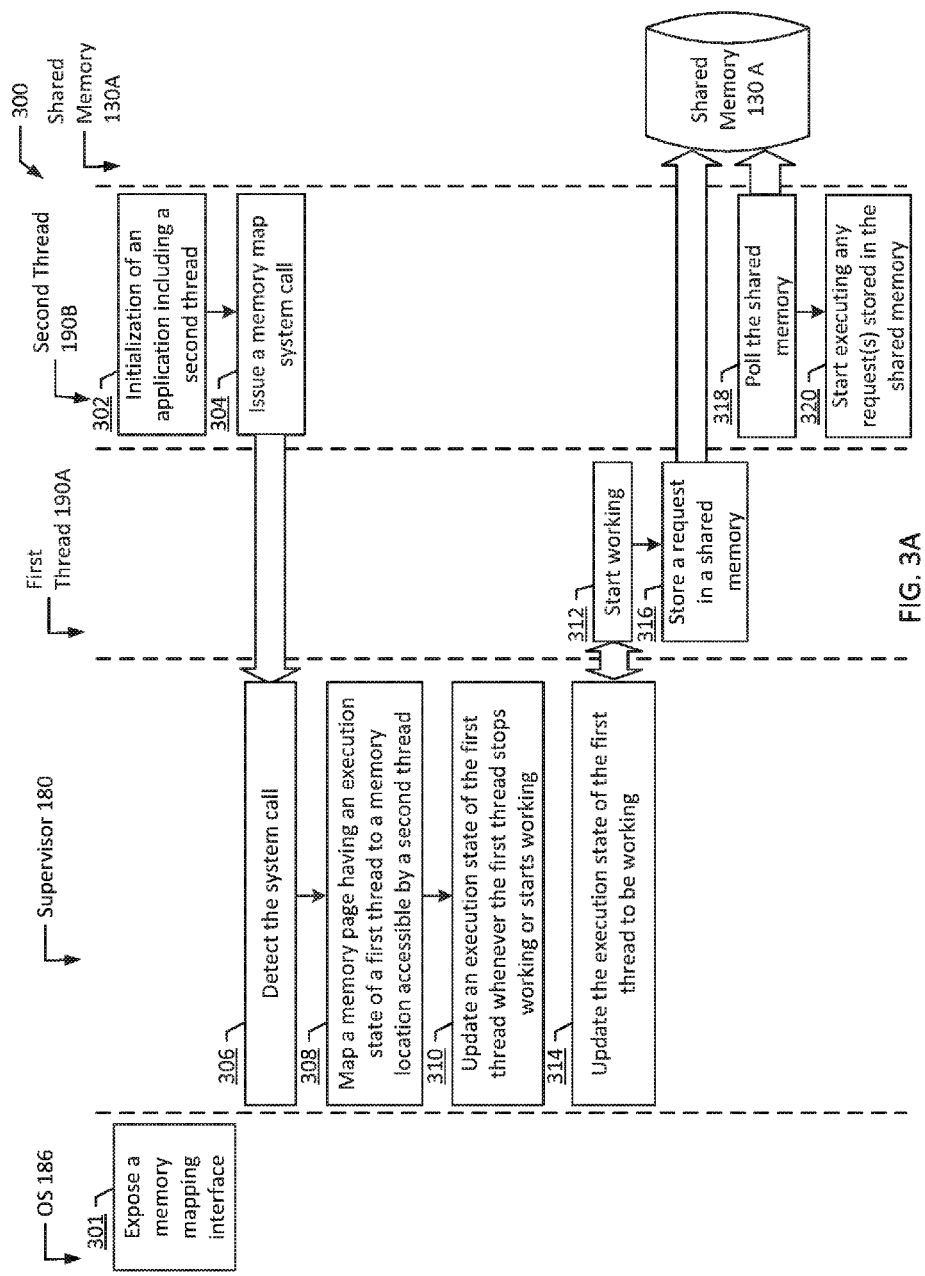
FIGS. 3A, 3B, and 3C are a flow diagram illustrating an example process for lightweight thread synchronization using a shared memory state according to an example embodiment of the present disclosure.
Figure 3B:
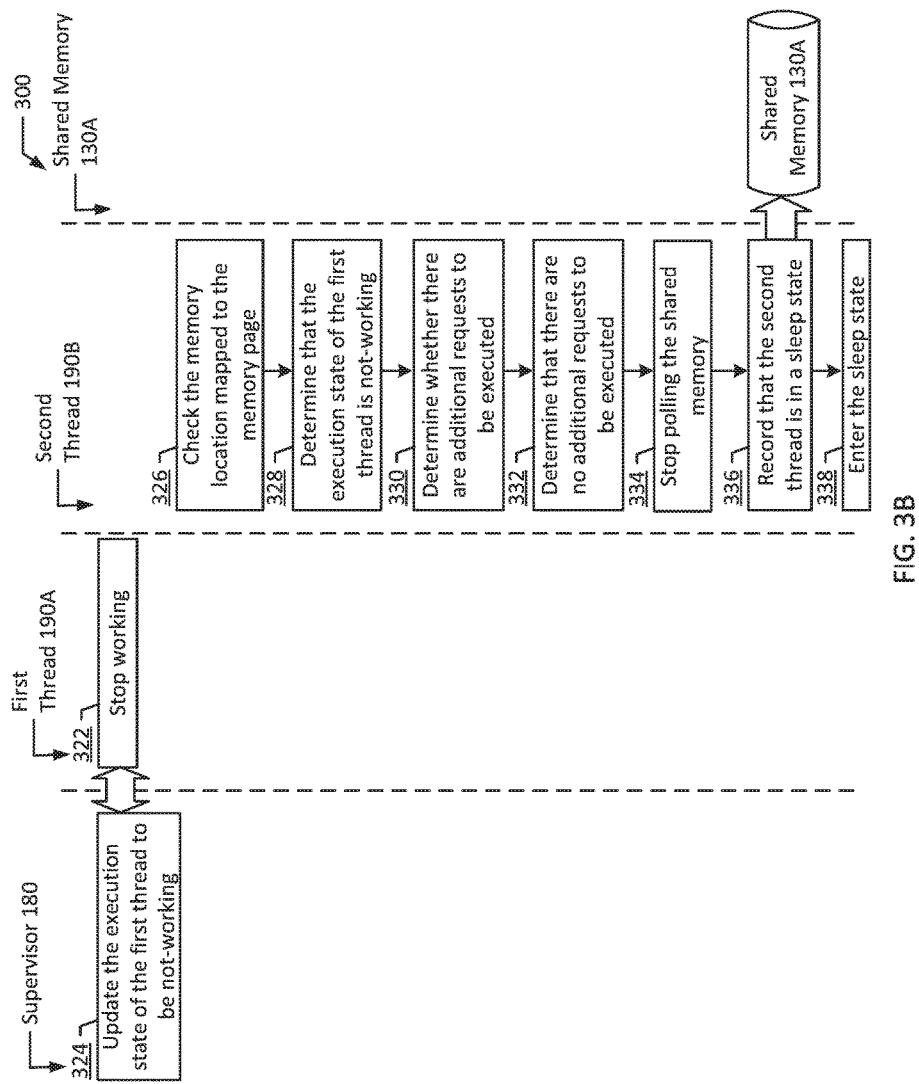
Figure 3C:
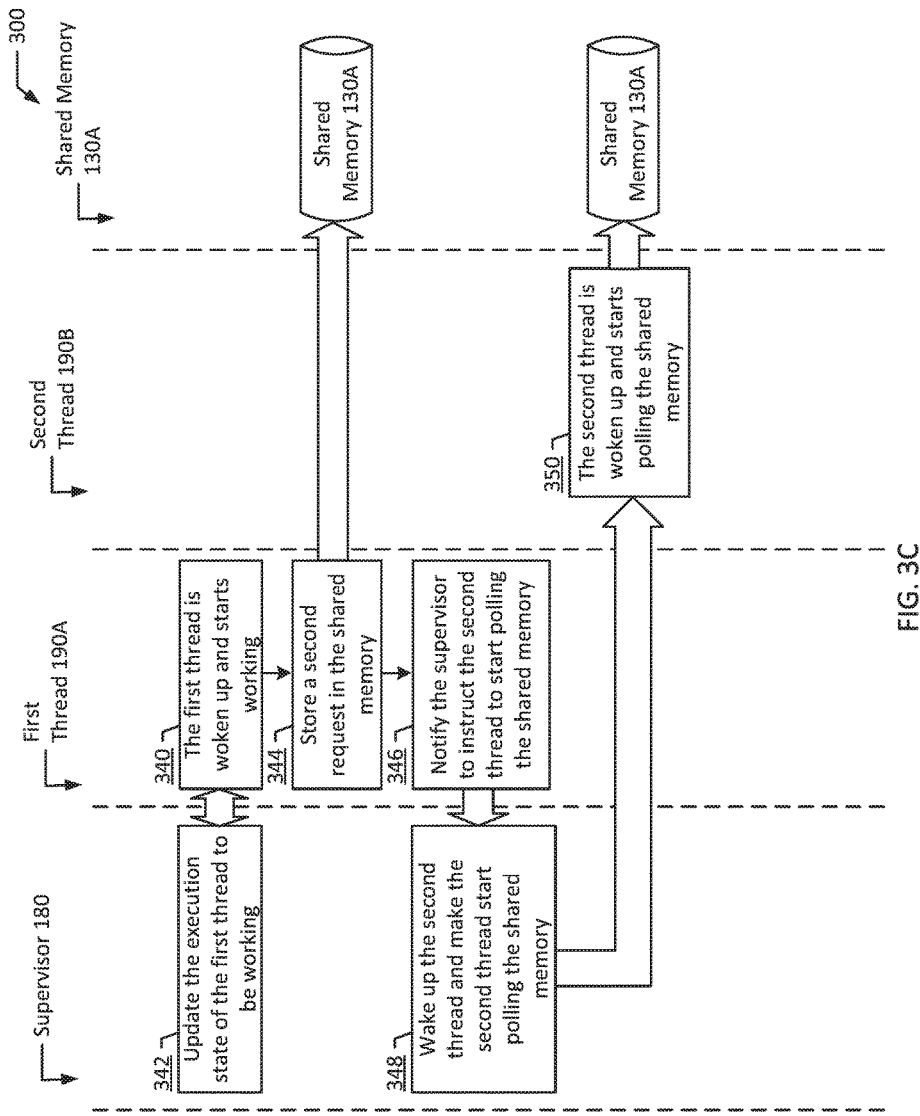

FIGS. 3A, 3B, and 3C illustrate a flow diagram of an example method 300 for lightweight thread synchronization using a shared memory state according to an example embodiment of the present disclosure. Although the example method 300 is described with reference to the flow diagram illustrated in FIGS. 3A, 3B, and 3C, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both. For example, the method 300 may be performed by a system including OS 186, supervisor 180, first thread 190A, second thread 190B, and shared memory 130A communicating or interacting with each other.

In the illustrated example, the OS 186 exposes a memory mapping interface (block 301). The OS 186 may be designed to have the memory mapping interface. An application including/using a second thread 190B may be initialized (block 302). During the initialization of the application, the second thread 190B may issue a memory map system call (block 304). In an example, the application including/using the second thread 190B may issue the memory map system call. The second thread 190B/application may issue the memory map system call through the memory mapping interface. Then, the supervisor 180 may detect the memory map system call (block 306). This memory map system call may cause the supervisor 180 in the OS 186 to map a memory page storing an execution state of a first thread 190A to a memory location accessible by the second thread 190B via memory access commands of a processor (block 308). For example, the second thread 190B may be able to access the memory location by executing regular CPU commands, such as memory read or memory write. In an example, the memory location may be a virtual address page of the second thread 190B. In an example, the memory mapping may be implemented once during the initialization of the application using the second thread 190B. In another example, the memory mapping may be implemented on demand, at random time instances, and/or at any other suitable time.

In an example, a file system 185 in the supervisor 180 may include a file allowing access to the memory page storing the execution state of the first thread. In an example, the supervisor 180 may store the execution state in multiple memory pages and update all of the multiple memory pages when the execution state changes. In an example, the memory page may be part of the shared memory 130A. In an example, the first thread 190A may be configured to store one or more requests in a shared memory 130A and the second thread 190B may be configured to poll the shared memory 130A to execute the one or more requests stored in the shared memory 130A. Then, the supervisor 180 may update an execution state of the first thread 190A whenever the first thread 190A starts working or stops working (block 310). For example, the supervisor 180 may update the execution state of the first thread 190A in the memory page mapped to the location accessible by the second thread 190B whenever the first thread 190A starts working or stops working. The execution state may be either a working state or a not-working state. For example, the memory page may be set to 0 ("Not-Working") or 1 ("Working"). In an example, a working state may be an executing state, and a not-working state may be either a preempted state or an idle state. In another example, a working state may be either an executing state or a preempted state, and a not-working state may be an idle state. In an example, the file system 185 may be/proc/<process-id>/running (e.g., on Linux).

When the first thread 190A starts working (block 312), the supervisor 180 may update the execution state of the first thread 190A to be working (block 314). After the first thread 190A starts working, the first thread 190A may store a request in the shared memory 130A (block 316). Then, the second thread 190B may poll the shared memory 130A (block 318) and start executing any requests stored in the shared memory 130A (block 320). When the first thread 190A stops working (block 322), the supervisor 180 may update the execution state of the first thread 190A to be not-working (block 324). In an example, after the supervisor 180 updates the execution state of the first thread 190A to be not working, the second thread 190B may check the memory location mapped to the memory page storing the execution state of the first thread 190A (block 326). In an example, mapping may refer to writing/recording the memory page data to/in the memory location. In an example, the memory location may be a page table accessible by the second thread 190B. In another example, the memory location may be a supervisor data structure. If the memory location is a supervisor data structure, processor page tables may need to be updated later after the second thread 190B's first access to the memory location (e.g., when the second thread 190B checks the memory location for the first time at block 326). Then, the second thread 190B may determine that the execution state of the first thread 190A is not-working (e.g., preempted) (block 328). Then, the second thread 190B may determine whether there are additional requests remaining to be executed (block 330). If the second thread 190B determines that there are no more requests to be executed (block 332), the second thread 190B may stop polling the shared memory 130A (block 334).

In an example, the second thread 190B may record in the shared memory 130A that the second thread 190B is in a sleep state (block 336) and may enter the sleep state (block 338). In another example, the second thread 190B may enter the sleep state by executing a read command on a file (e.g., a pipe). Then, the first thread 190A may be able to wake up the second thread 190B by executing a write command into this file. At block 330, if there are additional requests to be executed, the second thread 190B may execute the remaining requests and repeat this until there are no additional requests remaining to be executed in the shared memory 130A.

When the first thread 190A is woken up and restarts working (block 340), the supervisor 180 may update the execution state of the first thread 190A to be working (block 342). Then, the first thread 190A may store a second request in the shared memory 130A (block 344). The first thread 190A may notify the supervisor 180 to instruct the second thread 190B to start polling the shared memory 130A (block 346). Responsive to receiving the notification, the supervisor 180 may wake up the second thread 190B and make the second thread 190B start polling the shared memory 130A (block 348). The second thread 190B may be woken up and start polling the shared memory 130A (block 350).

Figure 4:
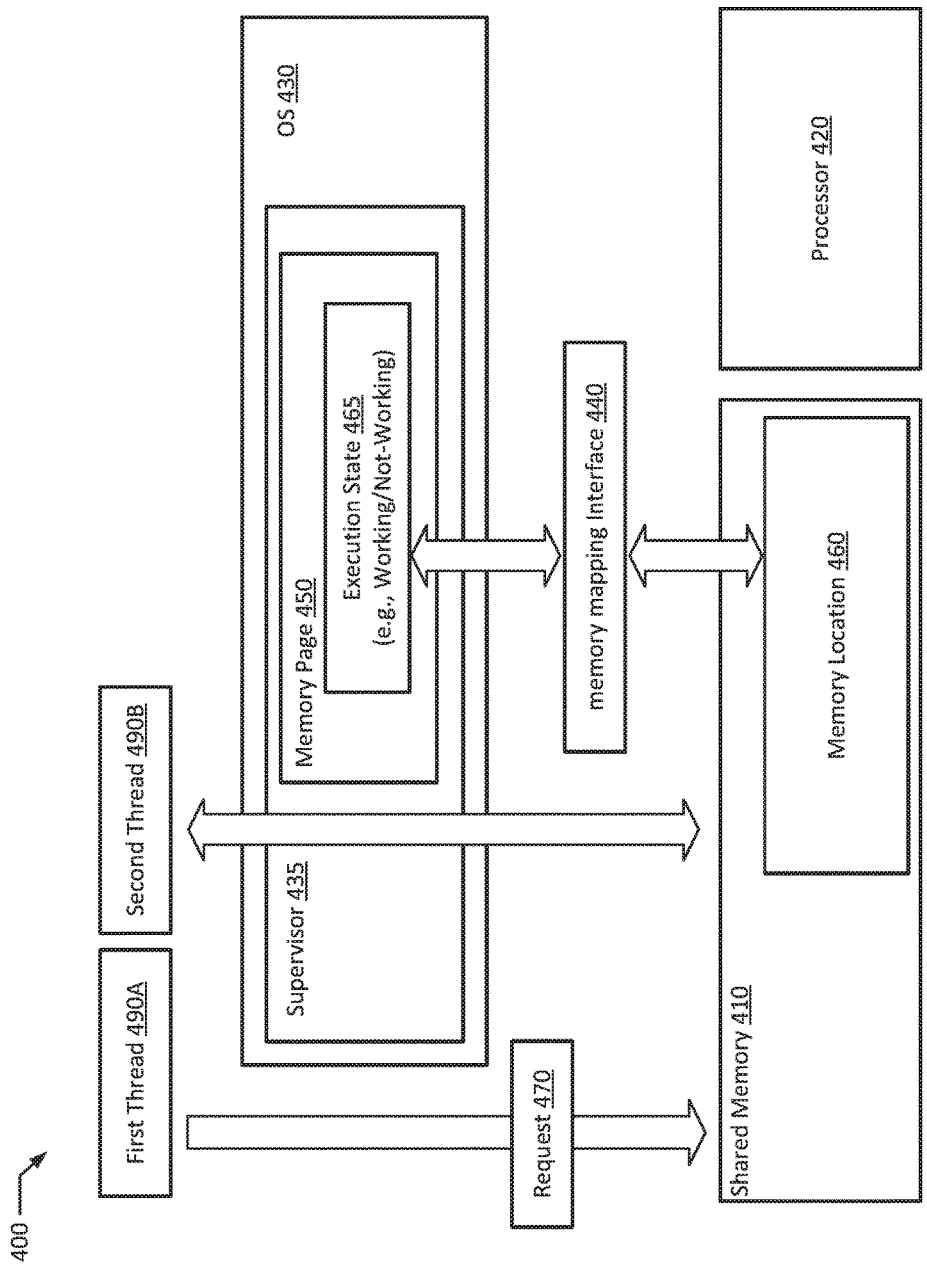
FIG. 4 is a block diagram of an example system according to an example embodiment of the present disclosure.

FIG. 4 shows a block diagram of an example system 400 according to an example of the present disclosure. As illustrated in FIG. 4, the example system 400 may include a shared memory 410, one or more processors 420 in communication with the shared memory 410, an operating system 430 executing on the one or more processors 420, and a supervisor 435 in the operating system 430. The one or more processors 420 may execute a first thread 490A and a second thread 490B. In an example, the operating system 430 may expose a memory mapping interface 440. The supervisor 435 may map a memory page 450 storing an execution state 465 of the first thread 490A to a memory location 460 accessible by the second thread 490B via memory access commands of a processor. In an example, the first thread 490A may be configured to store a request 470 in the shared memory 410. The second thread 490B may be configured to poll the shared memory 410 to execute the request 470 stored in the shared memory 410. The supervisor 435 may update the execution state 465 of the first thread 490A stored in the memory page. In an example, the execution state 465 may be either a working state or a not-working state.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The example embodiments may be embodied in the form of computer-implemented processes and apparatuses for practicing those processes. An embodiment may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   exposing, by an operating system executing on one or more processors, a memory mapping interface, wherein the one or more processors execute a first thread and a second thread;
   mapping, by a supervisor in the operating system, a memory page storing an execution state of the first thread to a memory location accessible by the second thread, wherein the first thread stores at least one request in a shared memory and the second thread polls the shared memory to execute the at least one request stored in the shared memory;
   updating, by the supervisor, the execution state of the first thread stored in the memory page, wherein the execution state is one of a working state and a not-working state;
   checking, by the second thread, the memory location mapped to the memory page storing the execution state of the first thread; and
   responsive to determining that the execution state of the first thread is the not-working state, stopping, by the second thread, the polling of the shared memory.

2. The method of claim 1, wherein the supervisor maps the memory page to the memory location during initialization of an application that includes the second thread.

3. The method of claim 1, wherein the supervisor maps the memory page to the memory location in response to receiving a memory map system call from an application that includes the second thread.

4. The method of claim 1, wherein the execution state of the first thread is updated responsive to each time the first thread stops working and each time the first thread starts working.

5. The method of claim 1, further comprising determining, by the second thread, whether there are additional requests to be executed in the shared memory.

6. The method of claim 5, further comprising, responsive to determining that there are no additional requests to be executed, recording, by the second thread, in the shared memory, that the second thread is in a sleep state.

7. The method of claim 6, further comprising, after the first thread is back in the working state, notifying, by the first thread, the supervisor to instruct the second thread to restart polling the shared memory.

8. The method of claim 5, further comprising, responsive to determining that there are additional requests to be executed, executing, by the second thread, the additional requests in the shared memory.

9. The method of claim 1, wherein when the execution state is the working state, the first thread is in an executing state, and when the execution state is the not-working state, the first thread is in one of a preempted state and an idle state.

10. A system comprising:
a shared memory;
one or more processors in communication with the shared memory, wherein the one or more processors execute a first thread and a second thread;
an operating system executing on the one or more processors; and
a supervisor in the operating system,
wherein the one or more processors:
expose, by the operating system, a memory mapping interface;
map, by the supervisor, a memory page storing an execution state of the first thread to a memory location accessible by the second thread, wherein the first thread stores at least one request in the shared memory and the second thread polls the shared memory to execute the at least one request stored in the shared memory; and
update, by the supervisor, the execution state of the first thread stored in the memory page, wherein the execution state is one of a working state and a not-working state,
wherein the second thread:
checks the memory location mapped to the memory page storing the execution state of the first thread; and
responsive to determining that the execution state of the first thread is the not-working state, stops the polling of the shared memory.

11. The system of claim 10, wherein the supervisor maps the memory page to the memory location in response to receiving a memory map system call from an application that includes the second thread.

12. The system of claim 10, wherein the execution state of the first thread is updated responsive to each time the first thread stops working and each time the first thread starts working.

13. The system of claim 10, wherein the second thread determines whether there are additional requests to be executed in the shared memory.

14. The system of claim 13, wherein responsive to determining that there are no additional requests to be executed, the second thread records in the shared memory that the second thread is in a sleep state.

15. The system of claim 14, wherein after the first thread is back in the working state, the first thread notifies the supervisor to instruct the second thread to restart polling the shared memory.

16. The system of claim 10, further comprising a memory manager and a thread scheduler in the supervisor, wherein the memory manager manages mapping of the memory page and the thread scheduler manages scheduling of the first thread and the second thread.

17. The system of claim 10, further comprising a file system in the supervisor, wherein the file system includes a file allowing access to the memory page storing the execution state of the first thread.

18. A non-transitory machine readable medium storing instructions, which when executed by one or more processors executing a first thread and a second thread, cause the one or more processors to:
expose, by an operating system executing on the one or more processors, a memory mapping interface;
map, by a supervisor in the operating system, a memory page storing an execution state of the first thread to a memory location accessible by the second thread, wherein the first thread stores at least one request in a shared memory and the second thread polls the shared memory to execute the at least one request stored in the shared memory; and
update, by the supervisor, the execution state of the first thread stored in the memory page, wherein the execution state is one of a working state and a not-working state;
wherein the second thread:
checks the memory location mapped to the memory page storing the execution state of the first thread; and
responsive to determining that the execution state of the first thread is the not-working state, stops the polling of the shared memory.

* * * * *